United States Patent
Meyer-Roscher et al.

[11] Patent Number: 6,159,557
[45] Date of Patent: Dec. 12, 2000

[54] PRODUCTION OF PRESSURE-SENSITIVE ADHESIVE TAPES, AND APPARATUS FOR IT

[75] Inventors: Bernd Meyer-Roscher, Lustadt; Klemens Mathauer, Ludwigshafen, both of Germany

[73] Assignee: BASF Aktiengesellschaft, Ludwigshafen, Germany

[21] Appl. No.: 09/076,135

[22] Filed: May 12, 1998

[30] Foreign Application Priority Data

May 16, 1997 [DE] Germany .............. 197 20 705

[51] Int. Cl.[7] .............. B05D 3/06; B05D 3/12; B05D 5/10
[52] U.S. Cl. .......... 427/512; 427/516; 427/172; 427/208.4; 427/290
[58] Field of Search ............... 427/505, 512, 427/516, 207.1, 172, 208.4, 290

[56] References Cited

U.S. PATENT DOCUMENTS

| | | | |
|---|---|---|---|
| 3,260,776 | 7/1966 | Lindstrom, Jr. et al. | 427/172 |
| 3,628,987 | 12/1971 | Nakata et al. | 427/208.4 |
| 3,891,008 | 6/1975 | D'Entremont | 427/172 |
| 4,052,527 | 10/1977 | Paster et al. | 427/208.4 |
| 4,181,752 | 1/1980 | Marten et al. | 427/516 |
| 4,298,633 | 11/1981 | Bradles | 427/172 |
| 4,443,491 | 4/1984 | McIntyre | 427/505 |
| 4,545,843 | 10/1985 | Bray | 427/208.4 |
| 4,968,558 | 11/1990 | Fisher et al. | 427/208.4 |
| 5,232,787 | 8/1993 | Gotoh et al. | 427/208.4 |
| 5,401,533 | 3/1995 | Borland | 427/208.4 |
| 5,665,444 | 9/1997 | Eguchi et al. | 427/516 |

FOREIGN PATENT DOCUMENTS

| | | |
|---|---|---|
| 699586 A1 | 3/1996 | European Pat. Off. . |
| 3234065 | 9/1982 | Germany . |
| 36 06 199 | 8/1987 | Germany . |
| 295 18 071 | 2/1996 | Germany . |
| 92/02348 | 2/1992 | WIPO . |
| 94/13451 | 6/1994 | WIPO . |

OTHER PUBLICATIONS

Patent Abst. of Japan, vol. 17, No. 103 (M–1374), Mar. 2, 1993 (JP 4294759, Oct. 19, 1992).
Derwent Publ. Ltd., Class A18, AN 86–186107 (JP 61118482). Pub. date Jun. 1986.
Derwent 87–243435/35 Feb. 1986.
Kleb– und Dichtstoffe Auchter et al., 14–20 Jahrgang 37, 1–2, 93. I don't know if there is a date or not—it all in German.

*Primary Examiner*—Marianne Padgett
*Attorney, Agent, or Firm*—Keil & Weinkauf

[57] ABSTRACT

The process for producing pressure-sensitive adhesive tapes comprises the steps of clamping a tube strip of a tube skin filled with a pressure-sensitive adhesive composition into an apparatus comprising a tubular appliance, passing the tube strip through the tubular appliance while opening the tube skin longitudinally to form a tape, separating the tape from the pressure-sensitive adhesive composition in such a way that some of the pressure-sensitive adhesive composition remains as a film on the tape, causing the separated pressure-sensitive adhesive composition to exit the apparatus by way of a discharge aperture, and winding up the tape separated from the pressure-sensitive adhesive composition, with the pressure-sensitive adhesive film that has remained thereon, as a pressure-sensitive adhesive tape.

10 Claims, 1 Drawing Sheet

PRODUCTION OF PRESSURE-SENSITIVE ADHESIVE TAPES, AND APPARATUS FOR IT

BACKGROUND OF THE INVENTION

The invention relates to a process for producing pressure-sensitive adhesive tapes and to an apparatus for implementing this process.

DE-A 36 06 199 discloses a process for applying a pressure-sensitive adhesive, comprising a liquid-containing mass, to a continuous paper web drawn from a supply roll. Pressure-sensitive adhesives (PSAs) of this kind are frequently supplied in containers, such as drums, for processing. However, these drums have the great disadvantage that in the majority of cases they cannot be emptied so as to leave no residues of the compositions originally present therein, thereby leading to unwanted residue contamination. This effect is encountered in particular when the pressure-sensitive adhesives are highly viscous materials. Of course, it is possible to refill the containers with the same material. However, it is found in practice that in the case of pressure-sensitive adhesives, for example, the same container can be filled only two or three times. After that, the impurities in the drum have an adverse effect on the properties of the product. The consequence is that the used containers must either be laboriously cleaned or else disposed of. This results in considerable waste volumes and high costs.

An alternative to the abovementioned drums for supplying pressure-sensitive adhesives are tube skins. This transportation and sales form is best known from the field of sausage skins. DE-U 29 518 071, for example, discloses a device for dispensing portions of pastelike fillings, especially for filling tube skins with sausage meat, which, to convey the sausage meat, features as its conveying element a rotary slide valve which is driven within a housing.

The less complex is the transportation and handling of tubes filled in this way, the more difficult it is to empty them, especially if the tube is filled with a pressure-sensitive adhesive. A similar problem is presented with a toothpaste tube. Such a tube can indeed be emptied completely by means of pressure exerted from the rearward, closed end of the tube in the direction of the opening. However, the greater the length of such a tube, or indeed of a skin tube of this kind, the more difficult it becomes to discharge product from one end by a pressure buildup at the other end. In the case of continuous tubes in particular, the pressure to be applied would have to be so great that any plastic film would burst as a result. Consequently, the use of continuous tubes in the production of pressure-sensitive adhesive tapes is not very common.

For the production of labels by applying pressure-sensitive adhesives, the pressure-sensitive adhesive components are generally held in supply tanks and in the course of processing are metered into a mixing vessel, from which the final pressure-sensitive adhesive is applied to the labels. An automated version of such a mixing system is described in the BASF brochure entitled "Perspektiven für die Verarbeitung von Dispersionshaft-klebstoffen" [Perspectives on the processing of dispersion-based pressure-sensitive adhesives] by J. Türk, H. Fietzek, H. Hesser and I. Voges. This brochure is a special print of a lecture given at the Finat Seminar in Neuss, Germany, 1992. It has also been published in Adhäsion 10/1993, pages 17 to 20.

SUMMARY OF THE INVENTION

It is an object of the present invention to provide a process for producing pressure-sensitive adhesive tapes which is designed such that it is possible to use tubes filled with the pressure-sensitive adhesives. In particular it is intended that the process ought to be able to be implemented, using an appropriate apparatus, in such a way that continuous and substantially complete emptying of the tubes is possible.

We have found that this object is achieved by a process for producing pressure-sensitive adhesive tapes which comprises the steps of clamping a tube strip of a tube skin filled with a pressure-sensitive adhesive composition into an apparatus comprising a tubular appliance, passing the tube strip through the tubular appliance while opening the tube skin longitudinally for form a tape, separating the tape from the pressure-sensitive adhesive composition in such a way that some of the pressure-sensitive adhesive composition remains as a film on the tape, causing the separated pressure-sensitive adhesive composition to exit the apparatus by way of a discharge aperture, and winding up the tape separated from the pressure-sensitive adhesive composition, with the pressure-sensitive adhesive film that has remained thereon, as a pressure-sensitive adhesive tape.

We have also found that this object is achieved by an apparatus for implementing the process, comprising a tubular appliance, having at least three apertures, and a winding device, the tubular appliance having at least one receiving aperture for receiving tube strips, at least one discharge aperture for the pressure-sensitive adhesive composition and at least one further aperture having a deflection device, and, between the (at least one) receiving aperture and the (at least one) further aperture, one or more, preferably two, slitting appliances.

Said further aperture of the tubular appliance is an aperture which, in terms of its position, is offset outwardly or laterally with respect to the—not necessarily straight—connecting line between the center points of the other two apertures. This aperture, therefore, does not necessarily point to the side but may alternatively, starting from the tubular appliance, point up or down, in other words in any desired spatial direction, as is explained in more detail below by means of the drawings; nevertheless, this further aperture is also referred to below as a lateral aperture.

DETAILED DESCRIPTION

Figure 1:
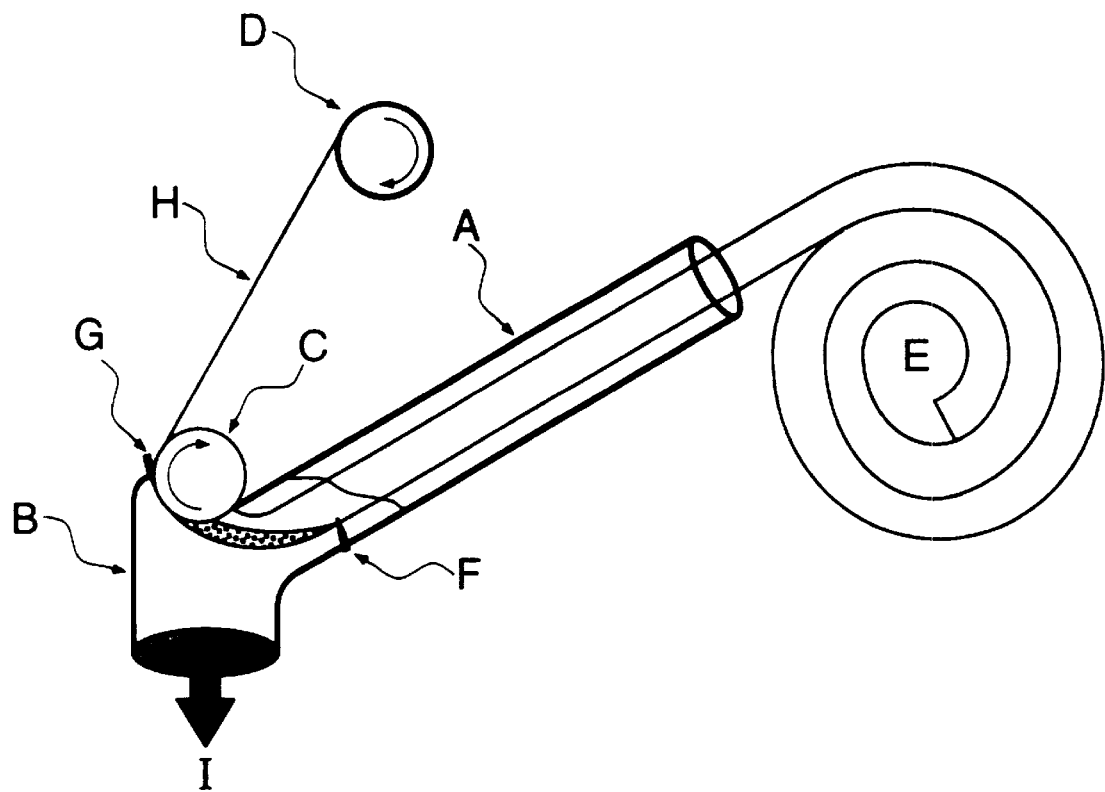
FIG. 1 shows the apparatus for practicing the invention.

To receive the tube strips, the novel process employs a tubular appliance whose diameter is at least as large as that of the tube strip that is to be received. The diameter of the tubular appliance—also referred to below as a pipe, although this does not necessarily mean that it is a straight pipe with a uniformly circular cross-section—is greater than that of the tube strip to be received to the extent where the tube strip can be guided through the tubular appliance with a force which is below the limit value which causes the tube skin to burst when the tube strip is passed through the tubular appliance. On the other hand, the ratio of diameter to length of the tubular appliance should be such that the pressure which builds up when the filled tube skin is emptied is able to dissipate over the length of the pipe of the appliance. The diameter and length of the tubular appliance should in particular be such that an accumulation of the composition in the tube skin is prevented. The precise numerical values for this are impossible to give in absolute dimensions, since they also depend on the nature of the pastelike pressure-sensitive adhesive composition present within the tube skin. In addition, these values also depend, individually, on the design of the appliance used for the novel process. For example, if the pipe for receiving the tube strips is arranged vertically, the value for the minimum or maximum diameter will be other than if the pipe or the tubular appliance is arranged in an inclined position or even, for greater ease of filling, horizontally. However, the particular values for the desired diameter can readily be determined by the skilled worker, by means of a few trial experiments if necessary.

In the context of the novel process, the opening of the tube strip is effected by means of at least one slitting appliance, in particular at least one bladelike, spikelike or cutting-rollerlike appliance, which is arranged between the entry aperture and the lateral aperture of the pipe. It is possible, for example, to fit two slitting appliances opposite one another. In this case, when the tube strip is opened the tube skin is cut into two halves. It is then also possible for these halves to be removed, by way of two opposite lateral apertures of the appliance, as flat tapes, films or sheets (referred to collectively below as tapes). Such an embodiment is preferred insofar as the operations of emptying the filled tube skins and thus of producing the pressure-sensitive adhesive tapes are less susceptible to disruption.

Within the tubular appliance, the tape itself is separated from the pressure-sensitive adhesive composition at a further aperture, in general the (at least one) lateral aperture. For this purpose the lateral aperture may house at least one slot, at least one expulsion unit and/or at least one peeling unit. The expulsion unit assists the separation of the pressure-sensitive adhesive composition from the skin tube which has been opened longitudinally. At the same time it has a deflecting action and is therefore also referred to as a deflection device. Owing to the consistency of the pressure-sensitive adhesive composition, it is preferred for this purpose to employ, in addition, a peeling unit located at the lateral aperture. The peeling unit can be a separate, fixed or adjustable, unit such as a peeling blade. It is preferable for the peeling blade to be adjustable in terms of its distance from the tape. The peeling unit may also comprise the lateral aperture's edge which has undergone appropriate constructional modification. Where the consistency of the pressure-sensitive adhesive composition allows it, the lateral aperture may, in a preferred case, be a slot. The slot makes it easier for the opened skin tube to exit the tubular appliance in the form of a tape. If, in the course of separating the pressure-sensitive adhesive composition, the tube skin is guided in this way via the expulsion unit and through the lateral aperture, for instance through a slot, then a tape, which can be would up subsequently for packaging, is obtained. The winding reel then contains, in compressed form, the tube skin bearing a film of pressure-sensitive adhesive on one side.

Preferably, at least two opposing lateral apertures are provided. In this case, of course, each of the further apertures contains a deflection device for easier winding or rolling of the pressure-sensitive adhesive tapes.

In the case of the apparatus for implementing the novel process, it is also possible for part of the tubular appliance, in the region between slitting appliance and peeling unit, to comprise a jacket-heated pipe or housing. This enables the temperature of the pressure-sensitive adhesive to be controlled and thus, for example, its consistency, for instance the viscosity, to be influenced as well. As a result, it is also possible in this way to control the process to a certain extent. Moreover, the blade itself can also be heated for this purpose.

The opening of the tube skins and separation of the resulting tapes of tube skin from the pressure-sensitive adhesive composition generally takes place at from 0 to 140° C., preferably from 20 to 120° C. In this case, as described, the filled tube is heated to the desired level by suitable means. The majority of the pressure-sensitive adhesive composition, which is discharged from the appliance, can be employed for the customary applications. For example, it may be passed into supply tanks, from which it is withdrawn in order to coat, for instance, labels or paper webs.

Following the opening of the filled tubes in the novel appliance, the tape which is obtained from the tube skin, and has a film of the pressure-sensitive adhesive composition, is discharged and wound up. This can be done, for example, using conveyor belts from Pagendarm. In the case of UV-crosslinkable pressure-sensitive adhesives, the actual winding is preceded by UV irradiation. This can be done using customary UV radiation equipment as produced, for example, by IST, Nürtingen (DE) or Fusion, Gaithersburg (USA).

With the aid of the novel appliance and/or of the novel process, it is therefore possible, in a simple manner, to produce a pressure-sensitive adhesive tape similar to a roll of sticky tape. In the specific case of the packaging of UV-crosslinkable pressure-sensitive adhesives in tubes and the emptying of these tubes with the aid of the apparatus described, it is advantageously possible to install a UV irradiation unit upstream of the winding device. This UV unit provides for establishment of the properties typical of pressure-sensitive adhesives, especially the increase in the molecular weight, before the roll of adhesive tape is provided.

Pressure-Sensitive Adhesive Compositions

In accordance with the invention, it is possible to employ any suitable pressure-sensitive adhesive compositions in the tube skins. They are preferably low in solvent or solvent-free. They may, for example, be pressure-sensitive adhesive compositions based on polyacrylates, silicones, epoxy resins or polyurethanes. Hotmelt systems which cure under the action of moisture can also be employed. In general the compositions are flexible solids in the manner of a polymer melt, the glass transition temperature of the polymer being below room temperature (25° C.). Suitable pressure-sensitive adhesive compositions are described, for example, in EP-A-0 377 199, U.S. Pat. No. 4,737,559, U.S. Pat. No. 4,847,137 and in the article "UV-Vernetzbare Acrylat-Schmelzhaftklebstoffe" [UV-crosslinkable acrylate hotmelt pressure-sensitive adhesives] by G. Auchter, J. Barwich, G. Rehmer and H. Jäger, Adhäsion, Kleben und Dichten, 37, 1 to 2/93, pages 14 to 20.

The compounds involved in this case are preferably compounds of relatively low molecular mass which are UV crosslinkable. They are employed in the pressure-sensitive adhesive compositions initially as low molecular mass compounds which have a low viscosity and/or a low glass transition temperature. Following application to the tapes, they are treated with UV light and crosslinked to give pressure-sensitive adhesive compositions of higher molecular mass which have the desired pressure-sensitive adhesive properties. In this case, preferably, the as yet uncrosslinked pressure-sensitive adhesive composition is applied to the tape and, following application but before winding, is irradiated with UV light and crosslinked. In the course of this procedure, it is possible to employ any suitable UV crosslinkers or UV initiators. These are described, for example, in the above-quoted article from Adhäsion, and also in EP-A-0 377 191, U.S. Pat. No. 4,737,559 and U.S. Pat. No. 4,847,137.

The pressure-sensitive adhesive compositions preferably feature UV crosslinkers based on benzophenone units.

Tube Skin

The tube skin can consist of any suitable materials. It preferably consists of polymer materials, such as polyamides, polypropylene, polyethylene, copolymers or polyesters. In this context, it is possible to employ, as skins, the support materials which are commonly used for pressure-sensitive adhesive films. Examples of suitable tube-skin materials are oriented polypropylene (OPP) and polyethylene terephthalate.

The thickness of the support layer, in other words of the tape, depends on the desired end uses and on the strength required for transportation of the filled tubes. Usually the thickness is from 10 $\mu$m to 1 mm. The thickness of the film of pressure-sensitive adhesive composition is preferably from 5 to 300 $\mu$m. When UV-crosslinkable pressure-sensitive adhesive compositions are employed, the thickness is preferably not more than 150 $\mu$m.

The novel process and apparatus are explained in more detail, using an example, by the attached drawing:

The filed tube (depicted here as a wound spiral (E)) is first of all guided through a pipe (A). Shortly before the discharge aperture or emptying point (B), which in this example takes the form of a pipe or housing which opens downward, a spike or a knife (F) is inserted into the guide pipe (A) from beneath. With the aid of this spike (F), the tube, which is pulled over and beyond it, is slit open lengthwise.

In addition, the pipe (A) has the function of preventing an accumulation of product in the direction of the tube spiral (E). This function is fulfilled by the pipe (A) being dimensioned such that it extends fairly closely around the tube, but still leaves enough room for the tube to be able to be pulled through without too great a resistance. In addition, the length of the pipe (A) must be such that the pressure which builds up as a result of emptying is not able to dissipate by sudden release at the pipe end, which would entail expansion or bursting of the tube.

After the tube has been slit open by the spike, the tube film is guided around the deflection roller (C) in such a way that it can be wound up on the winding reel (D). In this context, a peeling blade (G), whose distance from the deflection roller (C) is variable, is used to peel off that amount of the pressure-sensitive adhesive composition which, as the majority (I), flows of its own accord—as a result of viscosity and gravity—in the direction of the emptying point (discharge aperture) (B). The setting of the peeling blade (G) determines the thickness of the film of pressure-sensitive adhesive material on the tape (H).

We claim:

1. A process for producing pressure-sensitive adhesive tapes which comprises the steps of clamping a tube strip of a tube skin filled with a pressure-sensitive adhesive composition into an apparatus comprising a tubular appliance, passing the tube strip through the tubular appliance while opening the tube skin longitudinally, to form an initial tape, separating the initial tape from the pressure-sensitive adhesive composition in such a way that some of the pressure-sensitive adhesive composition remains as a film on the initial tape, to form a coated tape, causing the separated pressure-sensitive adhesive composition to exit the apparatus by way of a discharge aperture, and winding up the coated tape separated from the pressure-sensitive adhesive composition, with the pressure-sensitive adhesive film that has remained thereon causing the coated tape to be a pressure-sensitive adhesive tape.

2. A process as claimed in claim 1, where, within the tubular appliance, the separation of the initial tape from the pressure-sensitive adhesive composition takes place at at least one further aperture.

3. A process as claimed in claim 2, where a thickness of the pressure-sensitive adhesive film is established by means of a peeling unit.

4. A process as claimed in claim 1, where the pressure-sensitive adhesive composition is a UV pressure-sensitive adhesive composition and the coated tape is irradiated with UV light following separation from the pressure-sensitive adhesive composition, but before winding.

5. A process as claimed in claim 1, where the tube strip in the tubular appliance is heated or cooled before, during or immediately after the opening of the tube skin longitudinally to form the initial tape.

6. The process of claim 1 wherein the tubular appliance has a diameter that is greater than that of the tube strip such that the tube strip can be guided through the tubular appliance with a force below that which causes the tube strip to burst while passing through the tubular appliance.

7. The process of claim 1 wherein a ratio of a diameter to a length of the tubular appliance is such that a pressure, which builds up when the filled tube skin is emptied, is able to dissipate over the length of the tubular appliance of the apparatus.

8. The process of claim 1 wherein the opening of the tube strip to form the initial tape is effected by means of at least one slitting means.

9. The process of claim 8 wherein the at least one slitting means is a blade, cutting-roller or spike.

10. The process of claim 1 wherein following separation from the pressure sensitive adhesive composition, the coated tape passes through a deflection device and thereafter is wound up by way of a winding device.

* * * * *